United States Patent [19]

Hill

[11] 4,440,548
[45] Apr. 3, 1984

[54] PRESSURE SWING ABSORPTION SYSTEM

[75] Inventor: Joel D. Hill, Tulsa, Okla.

[73] Assignee: Calgon Carbon Corporation, Pittsburgh, Pa.

[21] Appl. No.: 369,694

[22] Filed: Apr. 19, 1982

[51] Int. Cl.³ .............................................. B01D 53/04
[52] U.S. Cl. .......................................... 55/26; 55/62; 55/68; 55/75; 55/162; 55/179; 55/389
[58] Field of Search ................... 55/25, 26, 62, 68, 75, 55/161–163, 179, 389

[56] References Cited

U.S. PATENT DOCUMENTS

| | | | |
|---|---|---|---|
| Re. 31,014 | 8/1982 | Sircar | 55/62 X |
| 2,944,627 | 7/1960 | Skarstrom | 55/62 X |
| 3,069,830 | 12/1962 | Skarstrom et al. | 55/62 X |
| 3,085,379 | 4/1963 | Kiyonaga et al. | 55/62 X |
| 3,104,162 | 9/1963 | Skarstrom | 55/62 X |
| 3,138,439 | 6/1964 | Skarstrom | 55/62 X |
| 3,141,748 | 7/1964 | Hoke et al. | 55/62 X |
| 3,142,547 | 7/1964 | Marsh et al. | 55/62 X |
| 3,176,444 | 4/1965 | Kiyonaga | 55/62 X |
| 3,338,030 | 8/1967 | Feldbauer, Jr. | 55/62 X |
| 3,430,418 | 3/1969 | Wagner | 55/62 X |
| 3,564,816 | 2/1971 | Batta | 55/62 X |
| 3,659,399 | 5/1972 | Kauer, Jr. et al. | 55/62 X |
| 3,710,547 | 1/1973 | Nelson | 55/58 |
| 3,738,087 | 6/1973 | McCombs | 55/62 X |
| 3,788,036 | 1/1974 | Lee et al. | 55/25 |
| 3,801,513 | 4/1974 | Munzner et al. | 252/421 |
| 3,891,411 | 6/1975 | Meyer | 55/26 |
| 3,962,129 | 6/1976 | Munzner et al. | 252/428 |
| 3,977,845 | 8/1976 | Walter | 55/25 |
| 4,013,429 | 3/1977 | Sircar et al. | 55/75 X |
| 4,021,210 | 5/1977 | Streich et al. | 55/75 X |
| 4,065,272 | 12/1977 | Armond | 55/58 X |
| 4,070,164 | 1/1978 | Miwa et al. | 55/75 X |
| 4,124,529 | 11/1978 | Juntgen et al. | 252/421 |
| 4,129,424 | 12/1978 | Armond | 55/62 X |
| 4,194,890 | 3/1980 | McCombs et al. | 55/18 |
| 4,197,095 | 4/1980 | White, Jr. et al. | 55/75 X |
| 4,256,469 | 3/1981 | Leitgeb | 55/62 X |
| 4,264,339 | 4/1981 | Juntgen et al. | 55/25 |
| 4,299,595 | 11/1981 | Benkmann et al. | 55/75 X |
| 4,329,158 | 5/1982 | Sircar | 55/62 X |
| 4,340,398 | 7/1982 | Dashi et al. | 55/62 X |
| 4,348,213 | 9/1982 | Armond | 55/62 X |

Primary Examiner—Robert H. Spitzer
Attorney, Agent, or Firm—R. Brent Olson; Ernest V. Linek; William C. Mitchell

[57] ABSTRACT

Gas mixtures are separated on a two column molecular sieve pressure swing adsorption (PSA) system to produce an enriched gas stream. This process features the use of a product gas purge, an inlet vent gas and feed gas for the repressurization of a regenerated column and does not require vacuum or an air receiver.

15 Claims, 1 Drawing Figure

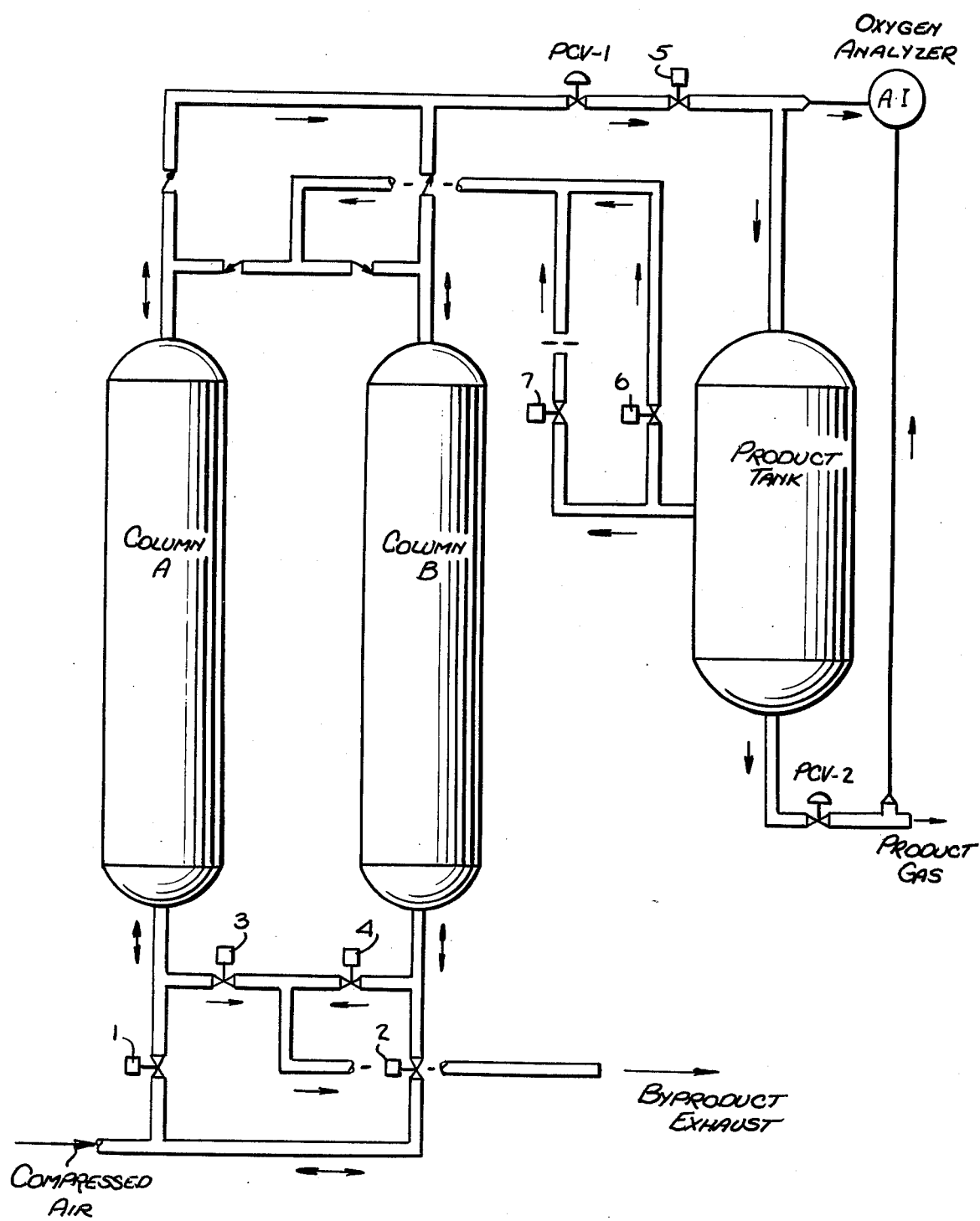

PRESSURE SWING ABSORPTION SYSTEM

BACKGROUND OF THE INVENTION

This invention relates to a method for obtaining in large volume a gas stream that is from 90% to 99% and higher by volume in one component of a gas mixture. This invention especially relates to an adsorption process for providing an enriched gas stream by means of a pressure swing adsorption (PSA) system using molecular sieves. More particularly, this invention relates to a method for providing an inexpensive and high volume source of gases such as nitrogen, hydrogen or methane, requiring less energy to operate than either cryogenic or other pressure swing adsorption systems, and yet supplying gases of comparable quality.

The point at which adsorption has ceased and the gas exiting the adsorbent was essentially the same in composition as the gas that entered the adsorbent is known as the breakthrough point. At some time prior to this breakthrough point, determined by either product gas purity or a timed cycle, the adsorbent must be regenerated.

The term gas mixture, as used herein, refers to the mixture of gases to be separated such as, air and other gas mixtures primarily comprised of two or more components of different molecular size. The terms enriched gas or product gas refer to a gas comprised primarily of that component of the gas mixture relatively unadsorbed after passage of the gas mixture through an adsorbent. For example, enriched gas may be comprised of from 90% to 99% and higher of the unadsorbed component of a gas mixture. The term vent gas as used herein, refers to that gas released countercurrently from the adsorbent column after the product fraction has been removed.

As described herein, gas normally flows in a cocurrent direction, i.e., into the column inlet and out of the column outlet. Gas flowing in the reverse direction, i.e., out of the column inlet is said to flow in a countercurrent direction.

A gas mixture may be fractionated, or separated, using pressure swing adsorption by passing the mixture at an elevated pressure through an adsorbent which is selective in its capacity to adsorb one or more of the components of the mixture. This selectivity is governed by the pore size distribution in the adsorbent and the total pore volume. Thus, gas molecules with a kinetic diameter less than or equal to the pore size are retained, or adsorbed, on the adsorbent while gas molecules of larger diameters pass through the adsorbent. The adsorbent, in effect, sieves the gas according to its molecular size.

Pressure swing adsorption processes usually include at least two columns of adsorbent so that while one column is being regenerated, the other is in the adsorption phase producing enriched product gas. Thus, by cycling between the columns product gas is delivered constantly. A pressure swing may be defined as the change in pressure associated with an adsorption cycle. For example, many PSA systems have a pressure swing from some positive pressure (above atmospheric or 0 psig) to a lower pressure, for example, atmospheric pressure (0 psig).

The use of carbon molecular sieves for the production of enriched nitrogen from air is a known process. These sieves posses a pore structure with a diameter comparable to the kinetic diameter of oxygen. Generally, these sieves are made from coconut, wood, or various forms of coal. See for example; Munzner et al., U.S. Pat. Nos. 3,801,513 and 3,962,129 and Juntgen et al., U.S. Pat. No. 4,124,529.

Also well known is the use of a pressure swing adsorption system for the separation of gas mixtures. See for example, McCombs et al., U.S. Pat. No. 4,194,890 wherein a pressure swing adsorption system employing a product gas purge and an inlet equalization step is described. The primary distinction between McCombs et al. and the instant process is that McCombs et al. requires a costly segregated adsorber (column) in addition to the two main adsorbers. This necessitates several additional partial pressure equalization steps during the adsorption cycle, including two inlet equalization steps per half cycle, compared to only one such step per half cycle for the instant process.

Other PSA systems for the separation of gas mixtures are known in the art. These include; Skarstrom, U.S. Pat. No. 2,944,627; Meyer, U.S. Pat. No. 3,891,411; Walter, U.S. Pat. No. 3,977,845 and Lee et al., U.S. Pat. No. 3,788,036.

Typical problems in the present pressure swing adsorption and molecular sieve technology include; low yield of product gas, large amounts of molecular sieve required, energy inefficient regeneration methods, use of costly vacuum systems and air receivers.

SUMMARY OF THE INVENTION

There is herein provided a pressure swing adsorption process employing a minimum of two columns for the generation of a stream of enriched gas which comprises the sequential steps of (a) passing a pressurized or compressed gas mixture cocurrently through a first adsorption column of molecular sieves thereby generating enriched gas, said gas flowing to a product tank; (b) prior to said first column breakthrough, partially pressurizing a second column of molecular sieves by passing a small fraction of enriched, or product gas from said product tank countercurrently to the second column, thereafter stopping said gas mixture flow to said first column; (c) partially venting said first adsorption column countercurrently, flowing the vented gas cocurrently to said second adsorption column, thereafter isolating said first column; (d) substantially simultaneously with step (c), passing said gas mixture cocurrently to said partly pressurized second column, thereby fully pressurizing said second column to the adsorption pressure; (e) countercurrently fully venting said isolated first column to atmospheric pressure while passing the gas mixture cocurrently through said pressurized second column thereby generating enriched gas; (f) regenerating said first column by countercurrently purging said first column with enriched gas; (g) repeating the sequence of steps (a)–(f) treating said second column as said first column and vice versa.

BRIEF DESCRIPTION OF THE DRAWING

The FIGURE is a schematic representation of one apparatus capable of employing the novel pressure swing adsorption process described herein.

DETAILED DESCRIPTION

The object of this invention is to provide a novel method of repressurization for a two adsorption column pressure swing adsorption system containing a molecular sieve such as activated carbon as the adsorbent. This repressurization method provides high product gas yields and purity while eliminating the need for costly inlet air receivers and vacuum regeneration systems common to conventional pressure swing adsorption systems.

The novel technique of this invention can be better understood by reference to the accompanying drawing which shows a two column pressure swing adsorption system for the fractionation of gas mixtures in accordance with this invention. Although the present invention is described and illustrated in connection with a preferred embodiment, carbon molecular sieves, it is to be understood that modifications and variations may be used without departing from the spirit of the invention. For example, instead of air being fractionated, any gas mixture containing by definition, two or more components separable by molecular size, will suffice. Further examples include, methane from carbon dioxide, methane from air, hydrogen from a mixture of carbon monoxide and carbon dioxide, hydrogen fron a mixture of hydrocarbon gases, and the like. Moreover, it is anticipated, that with minor modifications as to cycle times and pressures, other molecular sieves will be useful in the process of the present invention. Thus, zeolites and other selective adsorbents recognized in the art may also be employed in the present invention.

Referring to the drawing in detail, there is shown two pressure resistant columns, A and B, each of which is filled with carbon molecular sieves.

The series of valves connecting the pressure resistant columns A and B may be defined by the number shown in the drawing and by the function performed in this one preferred arrangement:

| (a) | Valves 1 and 2 | inlet air valves to columns "A" and "B" respectively. |
|---|---|---|
| (b) | Valves 3 and 4 | depressurization valves. |
| (c) | Valve 5 | product flow valve from columns "A" and "B" to the product tank. |
| (d) | Valve 6 | product gas repressurization valve from product tank to repressurizing column. |
| (e) | Valve 7 | product gas purge valve from product tank through the column under purge. |
| (f) | Valve PCV-1 and PCV-2 | pressure reduction (back pressure control) valves. |
| (g) | Check valves | control as flow directions. These are shown as arrows between the column connecting means. Gas flows in the direction of the arrow. |
| (h) | Restriction orifice | shown above valve No. 7. Restricts gas flow for purge. |

The gas mixture to be separated, air, is compressed and introduced into the system via either valve 1 or valve 2, and is herein referred to either as "feed air" or "gas mixture".

The feed air may be modified, prior to adsorption, by passing it through a dryer to remove excess humidity as a significantly reduced relative humidity may be preferred. Also, a filter or scrubber may be employed to remove other gases such as carbon dioxide or oxides of nitrogen. These steps improve the purity of the feed air and are employed when the specification for pure nitrogen mandates such prior removal. They are, however, auxiliary and not requisite to the successful operation of this invention.

Feed air is admitted to either column A or column B as a compressed gas via either valve 1 or valve 2 to selectively sieve (remove) oxygen as the feed air flows cocurrently through the carbon sieves. While a PSA process will operate within a wide range of actual pressures, it is preferred to select an adsorption pressure from the range of 3.0 to 8.0 bars for this process. Nitrogen product gas is discharged from column A, for example, through valve PCV-1, via valve 5 and is collected in the product tank. The product nitrogen gas oxygen concentration may be analyzed upstream of the product tank as a measure of instantaneous product gas purity, or downstream of the product tank as a measure of average product gas purity. A flow of product gas is discharged from the product tank at a constant pressure somewhat lower than the minimum pressure of the product tank. This is accomplished via pressure reducing valve PCV-2.

Each column is cycled through adsorption, partial equalization, depressurization, purge, product repressurization and feed repressurization steps. One system cycle is defined as the completion of these steps for both columns.

At the conclusion of each column adsorption cycle, the nearly spent carbon column is partially vented at its inlet (or bottom) and the vented gas is passed to the bottom (or inlet) of the column to be repressurized. This partial venting occurs substantially simultaneously with the cocurrent feed gas repressurization of the column being regenerated for adsorption by opening valves 1 and 2.

Following this partial "bottoms" equalization step, the nearly spent carbon column, B, is isolated and is totally depressurized to atmospheric pressure at its inlet via valve 4 thereby desorbing and exhausting quantities of byproduct exhaust, i.e., adsorbed oxygen. The vented column is then countercurrently swept with 0.1 to 1.0 bed volume of product gas at a controlled flow from the product tank introduced via valve 7 to purge the carbon column of additional residual and adsorbed oxygen via valve 4. The isolated column B is then partially regenerated by repressurizing with product gas from the product tank via valve 6 to from 10% to 30% of the adsorption pressure.

Final repressurization of the regenerated column is accomplished by the substantially simultaneous introduction of vented gas from the bottom of the column, which has completed its adsorption cycle, and compressed feed air, via open valves 1 and 2 until from 40% to 80% of the adsorption pressure is reached, after which valve 1 is closed. The simultaneous partial venting of the nearly spent column A, into the repressurizing column B, is a very brief part of the total feed repressurization cycle. As the repressurizing carbon column B reaches the adsorption pressure selected from the range of 3.0 to 8.0 bars, pressure control valve PCV-1 opens and the adsorption cycle begins as product gas is introduced to the product tank via valve 5. The cycle operations described are then repeated as column B produces enriched nitrogen gas and column A is regenerated. Table I shows a valve sequencing chart for the system cycle.

TABLE I

Valve Sequence Chart
Column Cycle Operations[1]

| Event No. | | Column Description | Valve Numbers | | | | | | |
|---|---|---|---|---|---|---|---|---|---|
| | | | 1 | 2 | 3 | 4 | 5 | 6 | 7 |
| 0 | A | Inlet Depressn. to B | X | X | | | | | |
| | B | Inlet Repressn. from A and Feed Gas Repressn. | | | | | | | |
| 1 | A | Vent to Atmosphere | | | X | X | | | |
| | B | Feed Repressn. | | | | | | | |
| 2 | A | Product Gas Purge | | | X | X | | | X |
| | B | Feed Repressn. | | | | | | | |
| 3 | A | Product Gas Purge | | | X | X | X | | X |
| | B | Adsorption | | | | | | | |
| 4 | A | Product Repressn. | | | X | | X | X | |
| | B | Adsorption | | | | | | | |
| 5 | A | Inlet Repressn. from B & Feed Gas Repressn. | X | X | | | | | |
| | B | Inlet Depressn. to A | | | | | | | |
| 6 | A | Feed Repressn. | X | | X | | | | |
| | B | Vent to Atmosphere | | | | | | | |
| 7 | A | Feed Repressn. | X | | X | | | | X |
| | B | Product Gas Purge | | | | | | | |
| 8 | A | Adsorption | X | | | X | X | | X |
| | B | Product Gas Purge | | | | | | | |
| 9 | A | Adsorption | X | | | X | X | | |
| | B | Product Repressn. | | | | | | | |

[1] Notes
Valve numbers represent the valves as shown in the drawing.
An X represents an open valve. Otherwise, the valves are closed.

The system cycle is continuously repeated alternatively using one column for the production of enriched nitrogen while the second column is regenerated and repressurized.

EXPERIMENTAL DATA

This process is a unique combination of methods for the operation of a pressure swing adsorption system for separation and enrichment of gases.

As shown in the examples below, two carbon molecular sieves were employed in the process of the present invention. One of these, carbon molecular sieve CMX, is avaliable from Calgon Corporation, Pittsburgh, Pa. The other carbon molecular sieve, herein designated BF, is available from Bergwerksverband GmbH (Bergbau-Forschung) of Essen, West Germany, under the designation of Mol. sieve coke.

The pilot plant for nitrogen generation consisted of two (2), 4-inch diameter by 44-inch deep adsorbent columns, each containing 13 pounds of a carbon molecular sieve (CMX) or (BF). It should be noted, however, that this process is not intended to be limited to one particular adsorbent nor to a specific gas mixture separation. The following examples demonstrate the value of this process for nitrogen generation from air. Based on these results, it is expected that other gas mixture separations are also possible.

An optimum PSA process may be defined as that which has the lowest capital cost. The Effective Carbon Capacity or ECC is equal to the amount of carbon in both adsorption columns divided by the product gas flow in standard cubic feet per hour. This parameter is directly proportional to the capital cost of a PSA system; i.e., the lower the ECC, the lower the capital cost. Yield is defined as the product gas flow from the product gas reservoir divided by the feed gas flow. Yield is inversely proportional to the compressor power requirement; i.e., the higher the yield, the lower the power requirement to produce a certain product gas quality.

EXAMPLE A

The pilot plant was operated in accordance with the process shown in Table II to produce greater than 97.5% nitrogen (less than 2.5% oxygen by volume). Experimental data generated under this mode of operation is shown in Table III.

There was a constant feed to the system of 1.68 Standard cubic feet per minute (scfm), to either the bed in the adsorption or regeneration mode. A nearly constant flow of 0.31 scfm was released from the product reservoir which contained an average of 2.4% oxygen. The system was allowed to operate for 48-hours under these conditions to assure that a steady-state had been achieved.

TABLE II

EXAMPLE A
Operating Cycle

| Event No. | Column A | | Column B | | Step Duration Seconds |
|---|---|---|---|---|---|
| | Mode | Pressure, psig | Mode | Pressure, psig | |
| 0 | Inlet Depress. to B | 55 | Inlet Repress. from A & Feed Gas Repress. | 45 | 5 |
| 1 | Vent to Atmosphere | 0 | Feed Gas Repressure. | 60 | 25 |
| 2 | Product Gas Purge | 0 | Feed Gas Repressure. | 80 | 30 |
| 3 | Product Gas Purge | 0 | Adsorption | 80 | 48 |
| 4 | Product Gas Repressure. | 20 | Adsorption | 80 | 12 |
| 5 | Inlet Repress. from B & Feed Gas Repressure. | 45 | Inlet Depress to A | 55 | 5 |
| 6 | Feed Gas Repressure. | 60 | Vent to Atmos. | 0 | 25 |
| 7 | Feed Repress. | 80 | Product Gas Purge | 0 | 30 |
| 8 | Adsorption | 80 | Product Gas Purge | 0 | 48 |
| 9 | Adsorption | 80 | Product Gas Repressure. | 20 | 12 |

TABLE III

EXAMPLE A
Experimental Results

| | |
|---|---|
| ½ cycle time | 120 seconds |
| Pressure Swing | 80 psig/0 psig |
| Carbon Molecular Sieve (CMX) | 13 lb/bed |
| Mass balance - ½ cycle | |
| (a) Total air feed | 0.00887 moles |
| (b) Gross Product (Product gas into product reservoir) | 0.00284 moles (2.4% $O_2$) |
| (c) Product Gas Repressurization | 0.00106 moles |
| (d) Product Gas Purge | 0.00014 moles |
| (e) Net Product Gas ((b) − (c)) − (d) | 0.00164 moles |
| (f) Depressurization and Purge to atmosphere | 0.00723 moles (25.1% $O_2$) |
| Yield (e/a) × 100 | 18.5% |
| Effective Carbon Capacity | 1.39 lb/SCFH |

EXAMPLE B

To verify that the conditions described in Example A for the separation of nitrogen from oxygen in air (appox. 21% $O_2$) are applicable to obtain a product gas having other oxygen concentrations, the same cycle was run yielding a 5% oxygen containing product gas. The cycle as described in Example A was used, but the total half-cycle time was extended to 2.5 minutes and the pressure swing was from 100 psig to atmospheric pressure (0 psig). Table IV reflects experimental results.

TABLE IV
EXAMPLE B
Experimental Results

| | |
|---|---|
| ½ cycle time | 150 seconds |
| Pressure Swig | 100 psig/0 psig |
| Carbon Molecular Sieve (CMX) | 13 lb/bed |
| Mass balance - ½ cycle | |
| (a) Total air feed | 0.01220 moles |
| (b) Gross Product (Product gas into product reservoir) | 0.00406 moles (5.0% $O_2$) |
| (c) Product Gas Repressurization | 0.00026 moles |
| (d) Product Gas Purge | 0.00047 moles |
| (e) Net Product Gas ((b) − (c)) − (d) | 0.00333 moles |
| (f) Depressurization and Purge to atmosphere | 0.00887 moles (26.9% $O_2$) |
| Yield (e/a) × 100 | 27.3% |
| Effective Carbon Capacity | 0.86 lb/SCFH |

To further test the utility of the present process for the generation of nitrogen gas, two commercially available carbon molecular sieves were compared in Table V under the preferred conditions of the present process (the Hill process). See Examples 1 and 2.

The process of the present invention (Hill) has also been compared for the generation of nitrogen gas (yield, purity, ECC) with a commercially available pressure swing adsorption process available from the British Oxygen Company (BOC). The BOC process includes the following operative steps:

(a) two column adsorption system
(b) adsorption in one column (2–5 bars)
(c) vacuum (20–70 torr) regeneration
(d) inlet and outlet pressure equalization
(e) feed gas pressurization All gas flow in the BOC process is pressure controlled during a 120 second half-cycle time. The process conditions and a preferred carbon molecular sieve are described in U.S. Pat. No. 4,015,965. The BOC PSA conditions generally are:

(a) carbon sieve-mol. sieve coke (BF)
(b) pressure swing-100 to 0 psig
(c) ½ cycle time-120 seconds
(d) air flow rate-8.7 bvm$^{-1}$ This comparative data (including Examples A and B) is set forth below in Table V.

TABLE V
BOC CYCLE, BF CARBON/HILL CYCLE, CMX CARBON

| EXAMPLE | CYCLE | CARBON | PRESSURE | FEED AIR FLOW BVM$^{-1}$ | ½ CYCLE TIME | % $O_2$ | ECC | YIELD |
|---|---|---|---|---|---|---|---|---|
| 1 | HILL | CMX | 80 PSIG | 5.18 | 120 SEC | 2.2 | 1.55 | 16.8 |
| 2 | HILL | BF | 80 PSIG | 5.09 | 120 SEC | 0.2 | 1.48 | 18.0 |
| 3 | HILL | BF | 80 PSIG | 6.90 | 90 SEC | 1.0 | 0.76 | 25.8 |
| 4 | BOC | BF | 100 PSIG | 8.75 | 70 SEC | 0.6 | 0.57 | 27.0 |
| 5 | BOC | BF | 80 PSIG | 6.56 | 90 SEC | 1.0 | 0.70 | 29.3 |
| 6 | BOC | BF | 80 PSIG | 5.16 | 120 SEC | 0.8 | 0.94 | 28.1 |
| 7 | BOC | BF | 80 PSIG | 4.63 | 120 SEC | 0.2 | 1.46 | 20.0 |
| 8 | BOC | BF | 100 PSIG | 10.03 | 70 SEC | 2.0 | 0.38 | 35.2 |
| 9 | HILL | BF | 100 PSIG | 8.94 | 70 SEC | 0.8 | 0.79 | 19.2 |
| 10 | BOC | BF | 100 PSIG | 10.28 | 75 SEC | 2.1 | 0.38 | 34.6 |
| 11 | BOC | CMX | 100 PSIG | 8.72 | 70 SEC | 4.2 | 0.62 | 25.1 |
| 12 | BOC | CMX | 100 PSIG | 7.91 | 70 SEC | 2.5 | 0.94 | 18.3 |
| 13 | BOC | CMX | 80 PSIG | 5.13 | 120 SEC | 2.5 | 1.61 | 16.4 |
| 14 | BOC | CMX | 100 PSIG | 5.72 | 150 SEC | 5.1 | 0.84 | 28.2 |
| 15 | BOC | CMX | 100 PSIG | 8.31 | 60 SEC | 2.3 | 0.96 | 17.0 |
| A | HILL | CMX | 80 PSIG | 5.25 | 120 SEC | 2.5 | 1.40 | 18.5 |
| B | HILL | CMX | 100 PSIG | 5.78 | 150 SEC | 5.0 | 0.86 | 27.3 |

Referring in detail to Table V, the process of the present invention (Hill) has been compared against the BOC process using both the BF and CMX carbon molecular sieves. Note that flow rates, cycle times and pressures have been modified to show the impact on product yield, purity and on carbon ECC.

Table VI describes the direct comparative tests of the BOC cycle and BF carbon molecular sieve against the process of the present invention (Hill) nd the CMX carbon molecular sieve.

TABLE VI
DIRECT COMPARISON RESULTS
HILL VS. BOC CYCLE
CMX VS. BF CARBON

| EXAMPLE | CYCLE | CARBON | PRESSURE | FEED AIR FLOW BVM$^{-1}$ | ½ CYCLE TIME | % $O_2$ | ECC | YIELD |
|---|---|---|---|---|---|---|---|---|
| 1 | HILL | CMX | 80 PSIG | 5.18 | 120 SEC | 2.2 | 1.55 | 16.8 |
| A | HILL | CMX | 80 PSIG | 5.25 | 120 SEC | 2.5 | 1.40 | 18.5 |
| 2 | HILL | BF | 80 PSIG | 5.09 | 120 SEC | 0.2 | 1.48 | 18.0 |
| 6 | BOC | BF | 80 PSIG | 5.16 | 120 SEC | 0.8 | 0.94 | 28.1 |
| 13 | BOC | CMX | 80 PSIG | 5.13 | 120 SEC | 2.5 | 1.61 | 16.4 |
| 4 | BOC | BF | 100 PSIG | 8.75 | 70 SEC | 0.6 | 0.57 | 27.0 |
| 11 | BOC | CMX | 100 PSIG | 8.72 | 70 SEC | 4.2 | 0.62 | 25.1 |
| 14 | BOC | CMX | 100 PSIG | 5.72 | 150 SEC | 5.1 | 0.84 | 28.2 |
| B | HILL | CMX | 100 PSIG | 5.78 | 150 SEC | 5.0 | 0.86 | 27.3 |

Referring in detail to Table VI, Examples 1 and 13 represent the Hill and BOC PSA cycles at the conditions preferred for the Hill system. Examples 4 and 11 represent the BOC PSA cycle at the conditions reported as preferred for the BOC system. Examples 14 and B show a mixture of the preferred conditions using CMX carbon. The pressure swing is 100 psig to 0 psig (BOC conditions) while the air feed flow rate is less than 6 bed volumes per minute (Hill conditions).

As the data in Tables V and VI indicate, the process of the present invention is clearly competitive with the commercially available BOC process. The basic difference in the two systems is one of capital cost. The BOC process requires a costly air receiver system, while the Hill process does not.

BENEFITS OF INVENTION

This process is a unique combination of methods for operation of a Pressure Swing Adsorption System. The PSA system has been operated with many different modes of repressurization, depressurization, regeneration, etc. and this process was found to be the most economical operation of a PSA process to generate nitrogen from air. Each step of this process aids in the product purity and/or improves the throughput of a given system, as shown in Table VII.

TABLE VII
SYSTEM ADVANTAGES

| | | |
|---|---|---|
| Purge Advantages: | (1) | improves regeneration of adsorbent bed by sweeping undesireable gas out of the intersticial void space. |
| | (2) | Fills voids with quality gas. |
| | (3) | Replaces vacuum as a means of regeneration. |
| Product Repressurization Advantages: | (1) | Prepares regenerated bed with quality gas. |
| | (2) | Protects upper end of adsorption bed by not letting it contact lower quality gas. |
| Bottoms Equalization Advantages: | (1) | Increases yield or amount of product per amount of feed by using gas of quality similar to feed from spent bed to repressure regenerated bed. |
| Feed Repressurization Advantages: | (1) | Does not require the use of an air receiver which has economic benefits. |
| | (2) | Compressor may be operated at a constant load. |

What is claimed is:

1. A molecular sieve, pressure swing adsorption process employing at least two columns for generating an enriched gas which comprises the sequential steps of:
    (a) passing a pressurized gas mixture at an adsorption pressure sufficient to support a pressure swing cocurrently through a first adsorption column of molecular sieves thereby generating enriched gas, said gas flowing to a product tank;
    (b) prior to breakthrough of said first column, partially pressurizing a second adsorption column of molecular sieves by passing a small fraction of enriched gas from said product tank countercurrently to said second column, thereafter stopping said gas mixture flow to said first column;
    (c) partially venting said first adsorption column countercurrently, flowing the vented gas cocurrently to said second adsorption column (bottoms equalization), thereafter isolating said first column;
    (d) substantially simultaneously with step (c), passing said gas mixture cocurrently to said partly pressurized second column, thereby fully pressurizing said second column to the adsorption pressure;
    (e) countercurrently fully venting said isolated first column to atmospheric pressure while passing the gas mixture cocurrently through said pressurized second column thereby generating enriched gas, said enriched gas flowing to said product tank;
    (f) regenerating said first column by countercurrently purging said first column with enriched gas from the product tank;
    (g) repeating the sequence of steps (a)-(f) treating said second column as said first column and vice versa.

2. The bottoms equalization step, Step (c) of claim 1 which occurs only once every half-cycle of the process.

3. The process of claim 1 wherein no vacuum system is used for adsorbent regeneration.

4. The process of claim 1 wherein no air receiver is required for said pressurized gas mixture.

5. The process of claim 1 wherein the molecular sieve is carbon molecular sieves, the gas mixture is air and the enriched gas is purified nitrogen.

6. The process of claim 1 wherein the adsorption pressure is selected from the range of 3.0 to 8.0 bars.

7. The process of claim 1 wherein the adsorption pressure is about 5.0 bars.

8. The process of claim 1 wherein said enriched gas is at least 95 percent nitrogen gas.

9. The process of claim 1 wherein said enriched gas is at least 97 percent nitrogen gas.

10. The process of claim 1 wherein said enriched gas is at least 99 percent nitrogen gas.

11. An apparatus for the fractionation of a gas mixture, said apparatus comprising a pressure swing adsorption unit having:
    (a) at least two pressure resistant housings for molecular sieve adsorbent, each housing having an inlet and an outlet;
    (b) a pressure resistant product gas housing having one inlet and at least two outlets;
    (c) a main gas mixture inlet;
    (d) a purge gas/waste gas outlet;
    (e) a first connecting means between said main gas mixture inlet and each of said molecular sieve housings inlets;
    (f) a second connecting means between said product gas housing inlet and each of said molecular sieve housings outlets;
    (g) a third connecting means between said purge/waste gas outlet and each of said molecular sieve housings inlets;
    (h) a fourth connecting means between one of said product gas housing outlets and each of said molecular sieve housings outlets;
there being a valve in each connecting means, said valves being arranged such that said molecular sieve housings are connected in a parallel gas flow arrangement, said valves being connected to a valve control means whereby gas flow in said unit is controlled by the opened or closed position of said valves such that said apparatus is capable of a continuous cycle between said two pressure resistant molecular sieve housings comprising the steps of (1) adsorption; (2) countercurrent venting between molecular sieve housing inlets; (3) product gas purge from said product gas housing; (4) partial repressurization with product gas from said product gas housing; (5) partial cocurrent repressurization using gas vented countercurrently from one molecular sieve housing; (6) final repressurization with feed gas and (7) adsorption.

12. The apparatus of claim 11 which further comprises a gas compressor for supplying said gas mixture to said main gas mixture inlet.

13. The apparatus of claim 11 wherein said valve control means comprises a timing means for operating said opening or closing of said valves.

14. The apparatus of claim 11 wherein no air receiver is employed for introducing a gas mixture.

15. The apparatus of claim 11 wherein no vacuum system is required to regenerate spent adsorbent.

* * * * *